June 11, 1968

W. R. MILLS, JR 3,388,253

RADIOACTIVE WELL LOGGING SYSTEM UTILIZING MECHANICALLY
CONTROLLED PULSED NEUTRON SOURCE
Filed March 25, 1964

WILLIAM R. MILLS, JR.
INVENTOR.

BY Arthur F Zobre

ATTORNEY

United States Patent Office 3,388,253
Patented June 11, 1968

3,388,253
RADIOACTIVE WELL LOGGING SYSTEM UTILIZING MECHANICALLY CONTROLLED PULSED NEUTRON SOURCE
William R. Mills, Jr., Dallas, Tex., assignor to Mobil Oil Corporation, a corporation of New York
Filed Mar. 25, 1964, Ser. No. 354,654
8 Claims. (Cl. 250—83.3)

This invention relates to pulsed radiation logging and more particularly to a borehole system for carrying out pulsed radiation logging operations.

In present day logging operations, pulsed radiation logging has promise of becoming a very important technique in the search for oil. In this technique, the formations are irradiated from a source with pulses or bursts of primary radiation spaced in time for the production of secondary radiation for detection in a borehole. Measurements are made of the secondary radiation detected after each burst of primary radiation to obtain information about the formations under investigation.

In one system for carrying out pulsed radiation logging operations, an accelerator-type neutron source comprising an ion source and a target is employed for producing bursts of fast neutrons. Voltage pulses produced from a pulse generator are employed to cyclically actuate the source for the production of bursts of fast neutrons. The voltage pulses produced for controlling the source also are employed for the production of synchronizing pulses for conditioning a radiation analyzing system.

It is an object of the present invention to provide a simple and unique borehole system for mechanically controlling a source and a pulse producing means for the production of bursts of primary radiation and synchronizing pulses. The system comprises a borehole unit containing a first material characterized by the continuous emission of radiation and a second material for emitting primary radiation of a different nature when exposed to radiation emitted by the first material. Control means is mounted for periodic mechanical movement relative at least to one of the materials to periodically apply to the second material radiation emitted by the first material substantially only during predetermined time intervals to produce bursts of primary radiation spaced in time. In the system of the present invention, advantage is taken of the movement of the control means to produce an accurate synchronizing pulse downhole at a fixed time relative to each burst of primary radiation for conditioning a radiation analyzing means. More particularly, means is provided which is responsive to the position of the control means to produce a synchronizing pulse concomitant with the production of each burst of primary radiation for conditioning a radiation measuring system located at the surface. In addition, a detector is provided for detecting secondary radiation in the borehole, the output of which is applied to the radiation measuring system at the surface.

In the embodiment disclosed, the target and source are moved relative to each other for the production of bursts of primary radiation. In the movement of the source or target, a switch means is actuated for the production of the synchronizing pulse. In a more specific aspect, the target produces neutrons when irradiated with radiation emitted by the source. In one embodiment, the source may be of the type which emits gamma radiation and a target of the type which emits relatively low energy neutrons when irradiatd with gamma rays.

For further objects and advantages of the present invention, and for a more complete understanding thereof, reference may be had now to the following detailed description taken in conjunction with the accompanying drawings, where:

Figure 1:
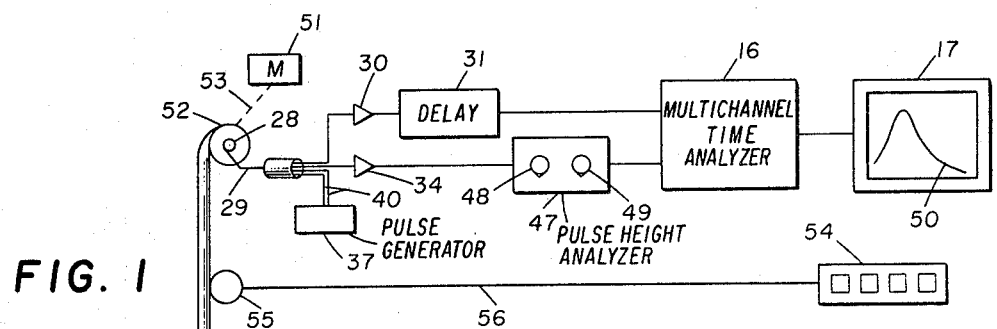
FIGURE 1 illustrates a radioactive well logging system employing the system of the present invention.

More particularly, in FIGURE 1 there is illustrated a borehole logging unit 10 containing a pulsed radiation source 11 and a radiation detector 12 employed for investigating the formations, for example, formation 13 traversed by a borehole 14 lined with iron casing 15. In the logging operations, the formations are irradiated with bursts of primary radiation spaced in time for the production of secondary radiation which is detected in the borehole by detector 12. The detector produces output pulses representative of the secondary radiation detected which are applied to the surface to an analyzer 16 coupled to a readout 17. The analyzer is triggered by a synchronizing pulse produced concomitant with each burst of primary radiation for analysis of secondary radiation detected following each synchronizing pulse.

The system of the present invention for carrying out these operations comprises a simple and unique borehole system for producing bursts of primary radiation and synchronizing pulses, as now will be described. More particularly, in the illustration shown, the pulsed radiation source 11 for producing bursts of primary radiation comprises a conventional source 18 which continuously emits radiation and target material 19 supported in container 20 which is periodically moved adjacent and away from the source 18 by means to be described hereinafter. When the target 19 is moved adjacent source 18, radiation emitted by the source 18 interacts with the material of the target 19 to produce a burst of primary radiation. In addition, means is provided which is actuated by movement of the target supporting means for the production of a synchronizing pulse at a fixed time relative to the beginning or end of each burst of primary radiation. This means comprises a switch which may be of the microswitch type, herein illustrated at 21, which is actuated when the target is moved toward the source 18 for the production of a synchronizing pulse.

More particularly, the switch comprises a spring member which normally is open and is positioned in the path of the target container 20 so that, when the target is moved toward the source, the switch is closed. Upon closure of switch 21, a circuit is completed from battery 22 across resistor 23 for the production of a rectangular-shaped pulse which is differentiated at 24. The leading peak of the differentiated pulse is clipped also at 24 and the resulting trailing peak is amplified at 25 and applied to the surface by way of conductor 26 of cable 27. The synchronizing pulses are taken from conductor 26 by slip ring and brush, illustrated at 28 and 29, and which are a part of a plurality of slip rings and brushes, and applied to analyzer 16 by way of amplifier 30 and delay circuit 31. The output of the detector 12 is applied to the surface for application to the analyzer 16 by way of amplifier 32 and conductor 33. At the surface, pulses are taken from conductor 33 by way of a slip ring and brush and applied to analyzer 16 by way of instrumentation, including amplifier 34.

In the embodiment of FIGURE 1, the means for moving the target relative to the source comprises a coil 35 and a permanent magnet core 36 which is coupled to and supports container 20 and target 19. The coil is actuated by a current pulse of one polarity to move the core 36 and hence the target 19 in a direction toward the source and then is actuated by a current pulse of an opposite polarity to move the core and target away from the source.

In the pulsing operations, the target 19 is moved rapidly from a desired maximum upper position to a lower position adjacent the source. In this lower position the target essentially surrounds the source for the production of a maximum amount of primary radiation. The target is allowed to remain at the lower position for a desired time and then is moved rapidly to the upper position where it remains for another desired time period. A pulse generator is provided in the unit 10 or at the surface for producing the desired current pulses for actuating the coil 35. In the embodiment disclosed, the pulse generator is located at the surface and illustrated at 37.

In one embodiment, the source 18 is a gamma ray emitter, for example, antimony-124, and the target 19 is of beryllium which produces neutrons upon the absorption of gamma rays of sufficiently high energy. A pulsed source of this type produces a high output of relatively low energy neutrons (mean energy of about 35 kev.) and yet requires a small volume of material. Such a source may be employed to investigate short-lived radioisotopes, for example, the sodium-24 isomer formed from sodium-23 upon the capture of thermal neutrons. This isomer has a half life of about 20 milliseconds and emits gamma rays of about 0.4 mev. which may be measured to distinguish salt water (sodium chloride dissolved in water) from oil in the formations. In the investigation of this isomer, a suitable pulse rate is of the order of four bursts of neutrons per second.

The vertical reciprocating system of FIGURE 1 has advantages of obtaining neutrons from antimony and beryllium in a small borehole since it allows the source and target to be moved adjacent to each other for the production of a maximum amount of neutrons and yet allows the target and source to be separated by a large distance. Since the gamma rays of antimony are of high energy and thus travel a relatively long distance in air before attenuation, a relatively large separation between the source and target is desirable to obtain a minimum amount of background, as can be understood by those versed in the art.

Other components of the system will now be described. The electrical pulses for actuating the coil 35 are applied downhole from generator 37 by way of conductors 40, slip rings and brushes, and conductors 41 of cable 27. As mentioned previously, since the core 36 is of the permanent magnet type, the application of pulses of opposite polarity to the coil will cause the core 36 to be reciprocated. The core 36 is supported for reciprocation by bearings 42 and is stopped at the desired upper and lower positions by the use of a stop member 43 employed at the end of the core and rubber or nylon bumpers 44 coupled to support members 45. A shield 46 is provided to shield the detector 12 from radiation emitted by the source 18.

The detector 12 may be a gamma ray or thermal neutron detector depending upon the type of measurements desired. A suitable thermal neutron detector may comprise a helium-3 proportional counter of the type disclosed in U.S. Patent No. 3,102,198. The gamma ray detector on the other hand may comprise a sodium iodide crystal coupled to a photomultiplier tube which produces pulses having a height proportional to the energy of the gamma rays detected. If a gamma ray detector is employed, a single channel pulse height analyzer 47 is employed at the surface and is adjusted to be responsive to gamma rays detected within a desired energy range. This adjustment is accomplished by adjustment of lower threshold control 48 and window width control 49. Analyzer 16 has a plurality of time windows, each of which sequentially opens and closes to accept pulses from pulse height analyzer 47. If a thermal neutron detector is employed, the detector pulses may be applied directly to the analyzer 16. The pulses accepted by each window are summed and at the end of a measurement sequentially applied to readout 17 for the production of a decay curve 50. The delay circuit 31 is employed to delay triggering of analyzer 16 until a desired period following each synchronizing pulse.

A motor 51, coupled to drum 52 by a mechanical connection 53, is provided to move the borehole unit 10 to a desired logging position. The depth of logging activity is read from meter 54 coupled to sheave 55 by connection 56.

Although instrumentation for recording a decay curve is disclosed, it is to be understood that suitable equipment, well known in the art, may be employed to record a continuous trace, in correlation with depth, and respresentative of the intensity of secondary radiation detected following each burst of primary radiation.

Figure 2:
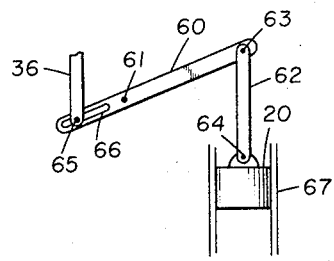
FIGURE 2 illustrates a modification of the system of FIGURE 1.

Referring now to FIGURE 2, there will be described a modification which may be employed with the same coil and core of FIGURE 1 to obtain a greater separation between the source 18 and the target 19 to further reduce radiation background. More particularly, the core 36 is coupled to target container 20 by way of linkage 60, pivoted eccentrically at support 61 and linkage 62 pivotally coupled to linkage 60 at 63 and to the container 20 at 64. Core 36 is coupled to linkage 60 by cam 65 which slides in aperture 66. As can be understood, movement of core 36 a given distance will cause container 20 to move a greater distance depending in part upon the length of linkage 60 and location of pivot support 61. Rails 67 are provided to guide the container 20 for vertical movement.

It is to be understood that other arrangements may be employed to reciprocate the target 19. For example, the target may be reciprocated by a linkage coupled to a rotary crank as can be understood by those versed in the art.

Figure 3:
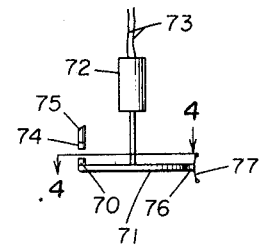
FIGURE 3 illustrates a further modification of the system of FIGURE 1.
Figure 4:
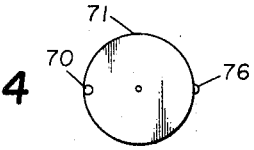
FIGURE 4 illustrates a portion of the system of FIGURE 3 taken along the lines 4—4 thereof.

FIGURES 3 and 4 disclose a further modification which may be employed in the system of FIGURE 1 for producing bursts of primary radiation. In this modification, the target is rotated by a support past a source for the production of bursts of primary radiation. In addition, switch means is actuated upon movement of the support to produce a synchronizing pulse concomitant with each burst of primary radiation. More particularly, referring to FIGURES 3 and 4, a target 70 is mounted on a circular disk 71 driven at a desired speed by a motor 72 which is supplied with energizing current from the surface by way of conductors 73. The target is periodically rotated past a source 74 secured to support 75 for the production of bursts of primary radiation. A cam 76 mounted on the disk 71, 180° from the target 70, and a spring-biased switch 77, located 180° from the source 74, are provided for producing a synchronizing pulse concomitant with each burst of primary radiation. More particularly, as can be understood, the rotation of the disk 71 causes the cam 76 to close switch 77 for the production of the desired synchronizing pulse in a manner similar to that described in the system of FIGURE 1. In the system of FIGURES 3 and 4, the source 74 employed may be a source of alpha particles such as polonium and the target may be of beryllium for the production of bursts of fast neutrons, as can be understood by those versed in the art.

Referring again to the system of FIGURE 1, the pulse generator 37 may be a suitable circuit employing silicon controlled rectifiers or a thyratron triggered by a suitable triggering circuit for producing the desired current pulses for energizing the coil 35. The target 19 may be cylindrical in shape, having a height of one inch, an outside diameter of one and one-half inches and an inside diameter of three-quarters of an inch. The antimony source 18 may be also cylindircal in shape having a height of three-quarters of an inch and a diameter of slightly less than three-quarters of an inch. The multichannel time analyzer 16 may be of the type manufactured by the Technical Measurement Corp., New Haven, Connecticut, Model CN–110, including a plug-in model 211, Time of Flight logic circuit. The pulse height analyzer 47 may be of the type manufactured by Hamner Electronic Company, Inc., Princeton, N.J., Model No. N–603.

Now that the invention has been described, modifications will become apparent to those skilled in the art, and it is intended to cover such modifications as fall within the scope of the appended claims.

What is claimed is:
1. In radiation well logging, a borehole system for producing periodically bursts of primary radiation spaced in time for irradiating the formations traversed by a borehole and synchronizing pulses for conditioning a radiation recording system comprising:
   a borehole unit for traversing a borehole,
   means including cable means for moving said borehole unit through a borehole,
   a first material located in said unit and characterized by the continuous emission of radiation,
   a second material located in said unit for emitting primary radiation of a different nature when exposed to radiation emitted by said first material,
   means located in said unit and mounted for periodic movement relative to at least one of said materials to expose periodically said second material to radiation emitted by said first material only during predetermined time intervals to produce bursts of primary radiation spaced in time,
   means located in said unit and responsive to the periodic movement of said last-named means to a predetermined position for producing a synchronizing pulse concomitant with each of said bursts of primary radiation produced from said second material when periodically exposed to radiation from said first material,
   detecting means located in said unit for detecting secondary radiation resulting from the irradiation of the formations with primary radiation, and
   means for applying the output of said detecting means and the pulses produced by said synchronizing means to said radiation recording system.

2. The system of claim 1 wherein said second material is characterized by the emission of neutrons when exposed to radiation emitted by said first material.

3. In radiation well logging, a borehole system for periodically producing bursts of primary radiation spaced in time for irradiating the formations traversed by a borehole and synchronizing pulses for conditioning a radiation measuring system located at the surface comprising:
   a borehole unit for traversing a borehole,
   means including cable means for moving said borehole unit through a borehole,
   said cable means including an electrical conductor transmission system coupled to said borehole unit and extending to the surface,
   a first material located in said unit and characterized by the continuous emission of radiation,
   a second material located in said unit for emitting primary radiation of a different nature when exposed to radiation emitted by said first material,
   means located in said unit and mounted for periodic movement relative at least to one of said materials to expose periodically said second material to radiation emitted by said first material only during predetermined time intervals to produce bursts of primary radiation spaced in time,
   means located in said unit and sensitive to the periodic movement of said last-named means to a predetermined position for producing a synchronizing pulse concomitant with the production of each of said bursts of primary radiation, and
   detecting means located in said unit for detecting secondary radiation resulting from the irradiation of the formations with said bursts of primary radiation,
   said synchronizing pulse producing means and said detecting means being coupled to said electrical conductor transmission system for applying synchronizing pulses and the output of said detecting means to said transmission system for transmission to the surface.

4. In a radiation well logging system, a borehole system for producing periodically bursts of primary radiation spaced in time for irradiating the formations traversed by a borehole and synchronizing pulses for conditioning a radiation measuring system located at the surface comprising:
   a borehole unit for traversing a borehole,
   means including cable means for moving said borehole unit through a borehole,
   said cable means including an electrical conductor transmission system coupled to said borehole unit and extending to the surface,
   a first assembly located in said unit and including a first material characterized by the continuous emission of radiation,
   a second assembly located in said unit and including a second material for emitting primary radiation of a different nature when exposed to radiation emitted by said first material,
   means located in said unit for periodically moving one of said assemblies relative to the other assembly to expose said second material to radiation emitted by said first material only during predetermined time intervals to produce bursts of primary radiation spaced in time,
   means located in said unit and responsive to the position of said one assembly for producing a synchronizing pulse concomitant with the production of each pulse of primary radiation, and
   detecting means located in said unit for detecting secondary radiation resulting from the irradiation of the formations with said bursts of primary radiation,
   said synchronizing pulse producing means and said detecting means being coupled to said electrical conductor transmission system for applying synchronizing pulses and the output of said detecting means to said transmission system for transmission to the surface.

5. The system of claim 4 wherein said first material is characterized by the continuous emission of gamma radiation, said second material being characterized by the emission of neutrons when exposed to gamma radiation.

6. The system of claim 4 wherein said first material is antimony-124 and said second material is beryllium.

7. In a radiation well logging system, a borehole system for periodically producing bursts of primary radiation spaced in time for irradiating the formations traversed by a borehole and synchronizing pulses for conditioning a radiation measuring system located at the surface comprising:
   a borehole unit for traversing a borehole,
   means including cable means for moving said unit through a borehole,
   said cable means including an electrical conductor transmission system coupled to said borehole unit and extending to the surface,
   a first material located in said unit and characterized by the continuous emission of radiation,
   a second material located in said unit for emitting primary radiation of a different nature when exposed to radiation emitted by said first material,
   sensing means located in said unit for generating a synchronizing pulse when actuated,
   means located in said unit and mounted for periodic movement relative at least to one of said materials to expose periodically said second material to radiation emitted by said first material only during predetermined time intervals to produce bursts of primary radiation spaced in time,
   said last-named means actuating said sensing means upon the production of said bursts of primary radiation for generating a synchronizing pulse concomitant with each of said bursts of primary radiation,
   said sensing means being coupled to said electrical conductor transmission system for applying synchronizing pulses to said transmission system for transmission to the surface for conditioning said radiation measuring system, and detecting means located in said unit for detecting secondary radiation resulting from the irradiation of the formations with said bursts of primary radiation, said detecting means being coupled to said electrical conductor transmission system for applying the output of said detecting means to said transmission system for transmission to the surface to said radiation measuring system.

8. A radiation well logging system for logging the formations traversed by a borehole comprising:

a borehole unit for traversing a borehole, means including cable means for moving said borehole unit through a borehole, said cable means including an electrical conductor transmission system coupled to said borehole unit and extending to the surface, a source of antimony-124 and a target of beryllium, both located in said unit, said source being located in a fixed position relative to said unit, switch means located in said unit for producing a synchronizing pulse when actuated, means located in said unit for supporting said target for movement periodically adjacent to and away from said source to expose periodically said target to radiation emitted by said source only during predetermined time intervals to produce bursts of neutrons spaced in time, said last-named means actuating said switch means when said target is moved adjacent said source for the production of a synchronizing pulse concomitant with the production of each burst of neutrons, a detector located in said unit for detecting secondary radiation resulting from the irradiation of the formations with said bursts of neutrons, said detector being coupled to said electrical conductor transmission system for applying the output thereof to said transmission system for transmission to the surface to said radiation measuring system, said switch means being coupled to said electrical conductor transmission system for applying synchronizing pulses to said transmission system for transmission to the surface for conditioning said radiation measuring system during each period defined by said bursts of neutrons spaced in time.

References Cited

UNITED STATES PATENTS

| | | | |
|---|---|---|---|
| 2,275,748 | 3/1942 | Fearon | 250—83.6 |
| 2,868,990 | 1/1959 | Reardon et al. | 250—84.5 |
| 2,971,091 | 2/1961 | Ball | 250—83.6 X |
| 2,991,364 | 7/1961 | Goodman | 250—83.6 X |
| 3,070,697 | 12/1962 | Muench | 250—84.5 X |

ARCHIE R. BORCHELT, *Primary Examiner.*